Feb. 12, 1924. 1,483,458
A. H. KUMMER
STEERING GEAR
Filed Nov. 9, 1921
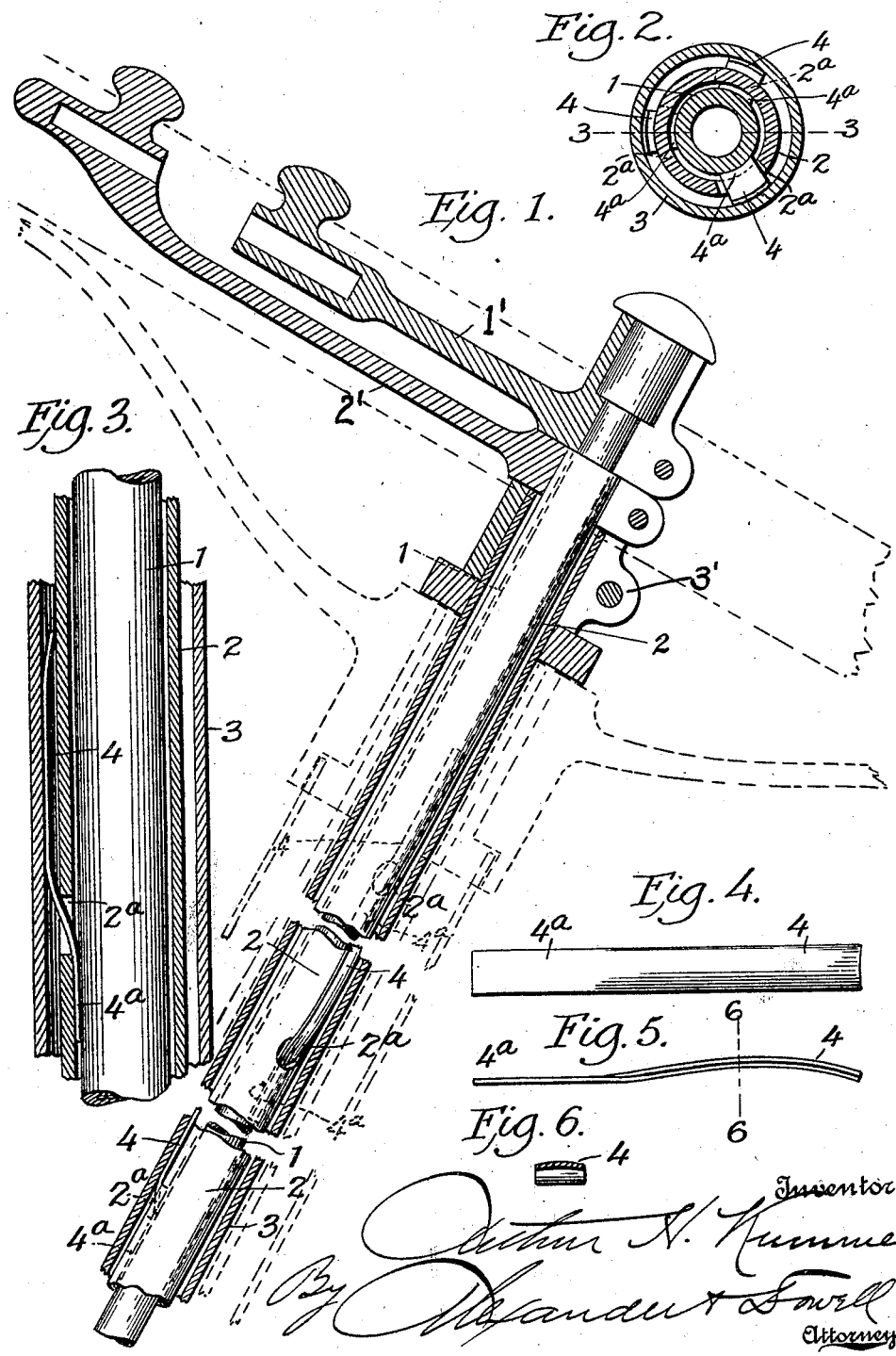

Patented Feb. 12, 1924.

1,483,458

UNITED STATES PATENT OFFICE.

ARTHUR H. KUMMER, OF LA FAYETTE, INDIANA, ASSIGNOR TO THE ROSS GEAR AND TOOL COMPANY, OF LA FAYETTE, INDIANA, A CORPORATION OF INDIANA.

STEERING GEAR.

Application filed November 9, 1921. Serial No. 513,952.

*To all whom it may concern:*

Be it known that I, ARTHUR H. KUMMER, a citizen of the United States, residing at La Fayette, in the county of Tippecanoe and State of Indiana, have invented certain new and useful Improvements in Steering Gears; and I hereby declare that the following is a full, clear, and exact description thereof, reference being had to the accompanying drawings, which form part of this specification.

This invention is a novel improvement in steering gears for automobiles and the like and its object is to eliminate the rattling in the steering gears incident to the nesting or assembling of the spark control tube or rod and the throttle control tube or rod within the steering gear control tube.

In the accompanying drawings I have illustrated one practical embodiment of the invention, and will explain the same with reference thereto, to enable others to adapt and use the invention but I do not consider the invention restricted to the specific construction of parts or application thereof shown in the drawings; and therefore refer to the claims for summaries of the essentials of the invention, novel features of construction, and novel combinations of parts for which protection is desired.

In said drawings:

Fig. 1 is a detail section through part of a steering gear of a well known construction, with my novel anti-rattling devices applied thereto.

Fig. 2 is an enlarged detail transverse section.

Fig. 3 is an enlarged detail longitudinal sectional view on line 3—3 Fig. 2.

Figs. 4 and 5 are top and side views of one of the anti-rattling springs detached.

Fig. 6 is a transverse section on the line 6—6 of Fig. 5.

In the ordinary types of steering gear commonly employed in automobiles and the like a spark control rod or tube 1 is arranged with a loose fit within the throttle control tube 2, which in turn is loosely fitted within the steering gear control sector tube 3, which latter is usually mounted concentrically of and within the steering wheel tube in the usual manner as conventionally indicated in dotted lines in Fig. 1. Owing to the length of the parts 1, 2 and 3 they have some lateral flexibility, and the jarring of the machine when in motion is apt to cause chattering or rattling noises due to contact between the nested parts 1, 2 and 3.

To eliminate this rattling or noise I place anti-rattling devices between the spark control rod, throttle control tube and sector tube. For this purpose I preferably employ springs as shown in the drawings. These springs (see Figs. 4 and 5) preferably have a shank portion $4^a$ and a slightly concave convex portion 4. The portion 4 is preferably curved transversely as well as longitudinally (see Fig. 6); the transverse curvature of the spring substantially conforming to the inner curvature of the sector tube 3.

These springs are positioned in place by inserting their shanks $4^a$ to openings $2^a$ in the throttle control tube 2 as indicated in Figs. 1–3, so that the shanks $4^a$ lie between the spark control rod 1 and throttle control tube 2, and the curved portions 4 lie between the throttle control tube 2 and the sector tube 3.

The springs should be so formed, and of such resiliency that they will tend to yieldingly press the spark tube or rod 1 and the throttle tube 2 laterally in opposite directions; and similarly tend to press the sector tube 3 and the throttle control tube 2 laterally in opposite directions.

Preferably a plurality of such anti-rattling devices or springs 4 are arranged, as shown, in a circumferential series around the rod 1 and within the tubes 2 and 3; and preferably the openings $2^a$ in the tube 2 are made at different points circumferentially of the tube spaced at different points throughout its lengths. I have shown three such holes in tube 2, and so located that the springs will be arranged at three equi-distant points around the tube 2 and at three separate points along its length.

By thus locating the anti-rattling springs around the rod 1 and within the tube 3 at different points and different heights they bind the three nested parts 1, 2 and 3 throughout their length sufficiently to prevent lateral vibration thereof sufficient to cause chatter or noise without impeding the free rotative action of the rod 1 within tube 2 and of tube 2 within the tube 3.

The rod 1 may be provided with the usual spark lever 1', and the throttle tube 2, with the usual throttle lever 2'. The sector tube 3 may be provided with a sector 3' in the usual manner.

As the present invention relates solely to the means for preventing anti-rattling I have not deemed it necessary to show the entire steering gear in detail as its parts may be of any desired construction, and the invention resides in means for preventing chatter and noise between the nested rods and tubes of the gear.

This invention does not require any openings to be cut in the sector tube 3, therefore no leakage of oil will be caused by the application of this invention to the well known types of steering gears using nested rods and tubes substantially as shown. The springs 4 are preferably made out of some anti-friction metal, such as spring brass or bronze, or such other material as may be suitable for the purpose and are preferably formed as shown in the drawings; but the shape and arrangement thereof might be varied within the scope of the invention while retaining the essential features thereof.

Having explained my invention what I claim is:

1. In a steering gear control member concentrically arranged; and anti-rattling devices each having a shank and a bowed spring portion separate from and interposed between said members to prevent rattling, said devices passing through holes in the intermediate control member.

2. A steering gear having three control members concentrically arranged, and anti-rattling devices each having a shank and a bowed spring portion separate from and interposed between the members to prevent rattling, said devices passing through holes in the intermediate control member.

3. A steering gear having three control members concentrically arranged, separately mounted and anti-rattling devices each having a shank and a bowed spring portion extending through the wall of the intermediate control member and pressing on the interior and exterior members to prevent rattling, substantially as described.

4. A steering gear having a sector member, a throttle control member, and a spark control member concentrically arranged; and anti-rattling devices extending through openings in the intermediate member arranged in circumferential series and spaced apart equal distances along the same, said devices pressing against the members within and without said intermediate member.

5. A steering gear having a sector member, a throttle control member and a spark control member which telescope one within the other, and anti-rattling devices extending through openings in the intermediate member arranged in circumferential series and spaced apart equal distances along the same, said devices causing pressure on the members within and without the intermediate member.

6. In a steering gear having a spark control member, a throttle control member, and a control sector tube or member concentrically arranged as described; separately mounted anti-rattling springs having a shank and a bowed spring end interposed between the members and passing through holes in the intermediate control member arranged in a circumferential series and spaced equal distances along its length to prevent rattling.

7. In a steering gear having a spark control member, a throttle control member, and a control member concentrically arranged as described; separately mounted anti-rattling devices interposed between the members and passing through openings in the intermediate control member located at equidistant points around them and at spaced distances apart along the length thereof, substantially as described.

8. In a steering gear having a control sector and a throttle control member therein having a plurality of openings and anti-rattling springs having a shank and a bowed spring end entered in each of said openings and engaged between the throttle control member and the control sector, substantially as described.

9. In a steering gear having a control sector, a throttle control member and spark control member, the throttle control member having a plurality of openings; and anti-rattling springs having a shank and a bowed spring and inserted through each of said openings, each spring having one end engaged between the spark control member and the throttle control member and its other end engaged between the throttle control member and the control sector, substantially as described.

10. In a steering gear having a control sector, a throttle control member, and a spark control member, the throttle control member having a plurality of openings arranged in circumferential series around it and spaced apart along its length; with anti-rattling springs each inserted in one of said openings and having one end engaged between the spark control member and the throttle control member and its other end engaged between the throttle control member and the control sector, substantially as described.

11. For a steering gear, a control tube having a plurality of openings arranged in a circumferential series and at spaced distances apart along its length for the engagement of anti-rattling devices, substantially as described.

12. For a steering gear an anti-rattling spring having a shank and a bowed spring end, substantially as and for the purpose specified.

13. For a steering gear, a control tube having a plurality of openings arranged in a circumferential series and at spaced distances apart along its length; and anti-rattling springs each having a shank portion inserted through an opening in the tube and a bowed spring portion, substantially as and for the purpose described.

In testimony that I claim the foregoing as my own, I affix my signature.

ARTHUR H. KUMMER.